US007269660B1

(12) United States Patent
Westfield

(10) Patent No.: US 7,269,660 B1
(45) Date of Patent: Sep. 11, 2007

(54) LIMITED TCP/IP IMPLEMENTATION USING MINIMAL RESOURCES

(75) Inventor: William Westfield, Atherton, CA (US)

(73) Assignee: Cisco Technology, Inc., San Jose, CA (US)

( * ) Notice: Subject to any disclaimer, the term of this patent is extended or adjusted under 35 U.S.C. 154(b) by 566 days.

(21) Appl. No.: 10/150,273

(22) Filed: May 17, 2002

(51) Int. Cl.
*G06F 15/173* (2006.01)
*G06F 15/16* (2006.01)

(52) U.S. Cl. .............. 709/230; 709/223; 709/224

(58) Field of Classification Search ........ 709/223–225, 709/227–228, 230
See application file for complete search history.

(56) References Cited

U.S. PATENT DOCUMENTS

| | | | |
|---|---|---|---|
| 6,112,246 A * | 8/2000 | Horbal et al. | 709/230 |
| 6,298,377 B1 * | 10/2001 | Hartikainen et al. | 709/223 |
| 6,397,220 B1 * | 5/2002 | Deisinger et al. | 707/102 |
| 6,473,783 B2 * | 10/2002 | Goshey et al. | 709/203 |
| 6,615,212 B1 * | 9/2003 | Dutta et al. | 707/10 |
| 6,801,507 B1 * | 10/2004 | Humpleman et al. | 370/257 |
| 6,993,585 B1 * | 1/2006 | Starkovich et al. | 709/228 |

OTHER PUBLICATIONS

PCT International Publication No. WO 00/76130 A1 by Bichot et al., International Publication Date Dec. 14, 2000.*
Http://www-ccs.cs.umass.edu/~shri/iPicTech.html, "IPic—A Tiny TCP/IP Stack", pp. 1-7, Jul. 14, 1999.
http://slashdot.org/articles/99/07/31/1654210.shtml, "The World's Smallest Webserver(s)", pp. 1-13, Jul. 31, 1999.
http://www-ccs.cs.umass.edu/~shri/iPic.html, "IPic—A Match Head Sized Web-Server", pp. 1-6, May 1, 2003.
Postel, J., "Darpa Internet Program Protocol Specification", RFC 792, pp. 1-20, Sep. 1981.
Fielding, R. et al., "Hypertext Transfer Protocol—HTTP/1.1", RFC 2068, pp. 1-142, Jan. 1997.

* cited by examiner

*Primary Examiner*—Ario Etienne
*Assistant Examiner*—Hussein El-chanti
(74) *Attorney, Agent, or Firm*—Cindy Kaplan

(57) ABSTRACT

Systems and methods for providing a highly useful partial implementation of a network protocol using limited processing and memory resources are provided. This allows network nodes embedded in simple devices such as light switches, thermostats, etc. to be reached using conventional open standard network protocols such as TCP/IP. A representative application is remotely adjusting a house thermostat by accessing a web page.

21 Claims, 7 Drawing Sheets

LIMITED TCP/IP IMPLEMENTATION USING MINIMAL RESOURCES

BACKGROUND OF THE INVENTION

The present invention relates to communication across a network in accordance with a protocol, and more particularly to systems and methods for employing minimal resources to provide a partial implementation of the protocol.

With the continued growth of the Internet, a great deal of attention is focused on the potential applications of broadband communication services for businesses and residences. Ubiquitous video conferencing, video on demand services that allow any movie to be watched anywhere at any time, and increasingly realistic network games are all envisioned. All of these applications involve very high-speed transmission of data between devices that incorporate very fast processors and ample memory resources.

However, there is also great potential utility in providing Internet access to appliances such as thermostats, hot water heaters, burglar alarms, light switches, etc. With the advent of inexpensive integrated circuits, these appliances often include processing capability in the form of low-cost microcontrollers. Such microcontrollers may operate at relatively low speeds and may incorporate less than 1 K of RAM and less than 64K of ROM.

It would be desirable to provide Internet access to such appliances. For example, one could, prior to coming home, set a desired house temperature and turn on an exterior light. A security company could readily monitor a large number of widely dispersed proximity sensors from a central location. There are also factory applications such as turning conveyer belts on and off. It would be especially desirable to accomplish all of these functions by accessing web pages. These requirements lead directly to the desirability of implementing Internet protocols such as TCP/IP and HTTP on the already ubiquitous microcontrollers.

A problem arises in that the full implementation of protocols such as TCP/IP and HTTP is in fact quite complex and beyond the memory and processing resources of low cost microcontrollers as are found in thermostats, burglar alarms, etc. What is needed are systems and methods for providing Internet capability to devices that do not incorporate sufficient processing power and/or memory resources.

SUMMARY OF THE INVENTION

Systems and methods for providing a highly useful partial implementation of a network protocol using limited processing and memory resources are provided by virtue of one embodiment of the present invention. This allows network nodes embedded in simple devices such as light switches, thermostats, etc., to be reached using conventional open standard network protocols such as TCP/IP. A representative application is remotely adjusting a house thermostat by accessing a web page.

A first aspect of the present invention provides a method for operating a server to handle a request from a client. The method includes: receiving a packet via a network interface from the client, determining a response to the packet based on progress within a predefined interaction, the predefined interaction following a protocol fully implemented by the client but not by the server, and transmitting the response to the client.

A second aspect of the present invention provides apparatus for operating a server to handle a request from a client. The apparatus includes: a network interface that communicates with the client via a network, a memory system that stores information representing a predefined interaction between the server and the client, the predefined interaction following a protocol fully implemented by the client but not by the server, and a processor that responds to the request based on the information representing the predefined interaction.

Further understanding of the nature and advantages of the inventions herein may be realized by reference to the remaining portions of the specification and the attached drawings.

DESCRIPTION OF SPECIFIC EMBODIMENTS

The present invention will be described with reference to an example partial implementation of TCP/IP and HTTP that provides a simple web server capable of responding to a request for a web page. The present invention, however, may be applied to partially implement any suitable network protocol.

In one embodiment, a partial protocol implementation is provided by pre-storing a first series of input templates used to identify protocol packets that may be received and a second series of response templates used to generate a response. When a packet is received via the network, it is compared to relevant input templates and a match is found. Relevant variable portions of the received packet are extracted and a template for the response packet is selected. Appropriate information is inserted at selected points in the selected response template to form a response packet.

Figure 1:
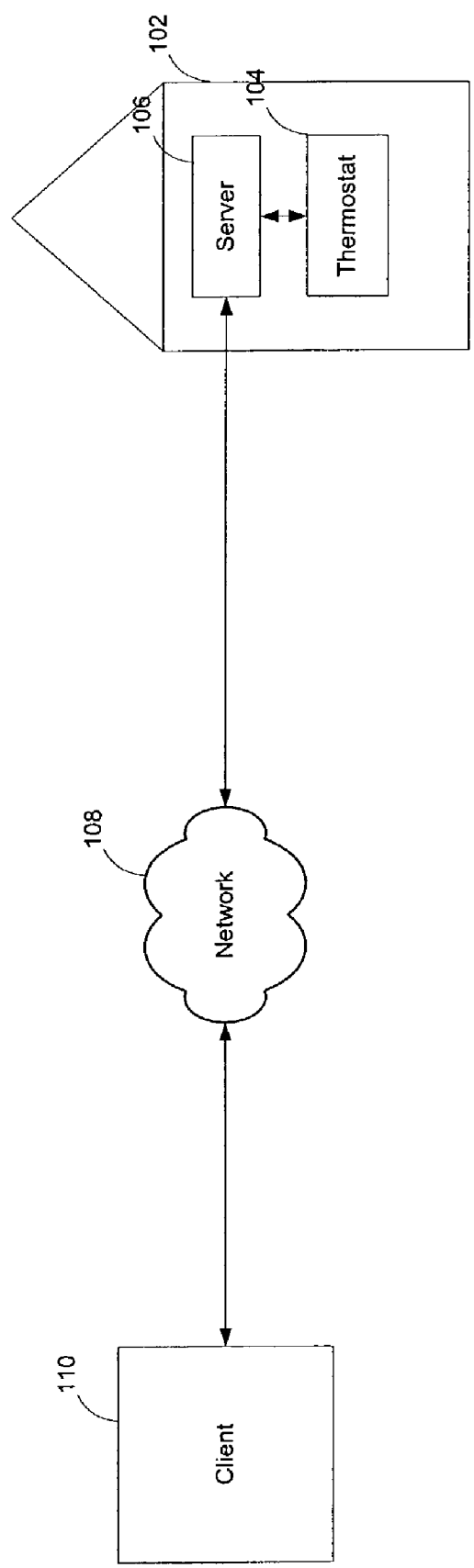
FIG. 1 depicts a client-server application according to one embodiment of the present invention.

FIG. 1 depicts one possible client-server application according to one embodiment of the present invention. Within a house 102 there is a thermostat 104. The thermostat permits one to monitor and control the interior temperature of house 102. As is known in the art, a microcontroller may be provided for controlling the operation of thermostat 104. The microcontroller and associated circuitry may provide, for example, a local digital display of thermostat status, a touch screen or keypad for data entry, etc.

According to one embodiment of the present invention, the microcontroller may also implement a server 106 to permit remote operation of thermostat 104 including both reading and setting of temperature. Server 106 is coupled to a network 108. In one embodiment, network 108 is the Internet. House 102 may be equipped with a residential access gateway (not shown) incorporating DSL, cable modem, or wireless technology to provide access to network 108. Also server 106 may interface with this residential gateway using a home Ethernet, home wireless network, etc.

Many different nodes may access server 106 via network 108 including a representative client 110. Client 110 is, in one example, a desktop computer at the work place of a resident of house 102. Client 110 is equipped with full implementations of protocol such as TCP/IP and HTTP. Server 106, however, operates in accordance with these protocols but only in a limited set of situations that have been anticipated in advance. In one embodiment, server 106 implements a simple web page for reading and adjusting temperature parameters of thermostat 104.

Figure 2:
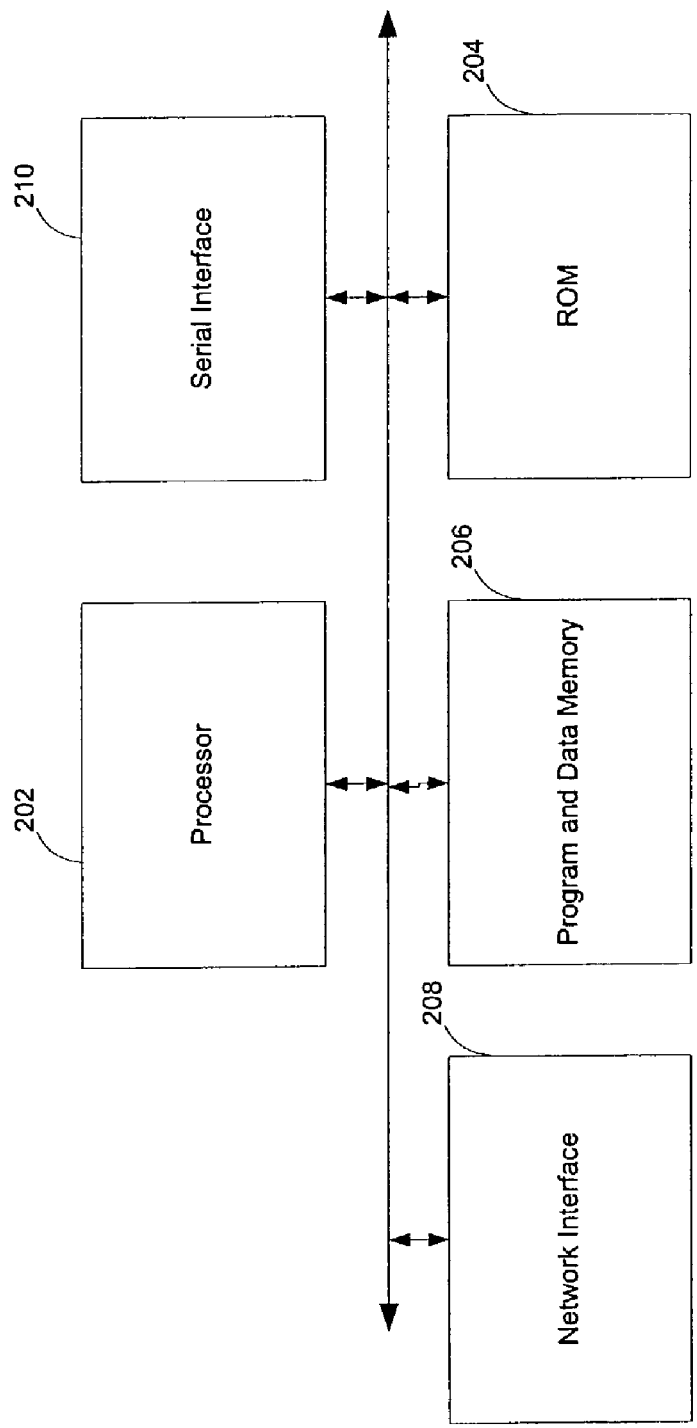
FIG. 2 depicts a server architecture according to one embodiment of the present invention.

FIG. 2 depicts details of server 106 according to one embodiment of the present invention. A processor 202 performs network protocol operations as described below and also provides electronic control of thermostat 104. Processor 202 may be a microcontroller such an eight-bit microcontroller. In one embodiment, processor 202 is one of the COP800 series of microcontrollers available from National Semiconductor, Inc. of Santa Clara, Calif. Processor 202 may, however, be implemented in any suitable way. Instructions for operating processor 202 may be stored in a read-only-memory (ROM) 204. In one embodiment, ROM 204 may include less than 64K of capacity. In operation, instructions for processor 202 may also be temporarily stored in a program and data memory 206 that may be implemented as random-access-memory (RAM). Memory devices 204 and 206 are only representative examples of computer-readable storage media that may be used. Instructions for processor 202 may be stored on a floppy disc, CD-ROM, etc. Also, another example of a computer-readable storage medium usable for storing instructions for processor 202 is loading the instructions from the network.

Processor 202 connects to network 108 via a network interface 208. Network interface 208 may be, e.g., an Ethernet network interface or any suitable network interface. A serial interface 210 is provided to send data to and from relevant components and/or transducers of thermostat 104. Note that it is possible to combine many of the elements of FIG. 2 within a single integrated circuit to provide further miniaturization and reduced cost.

Figure 3:
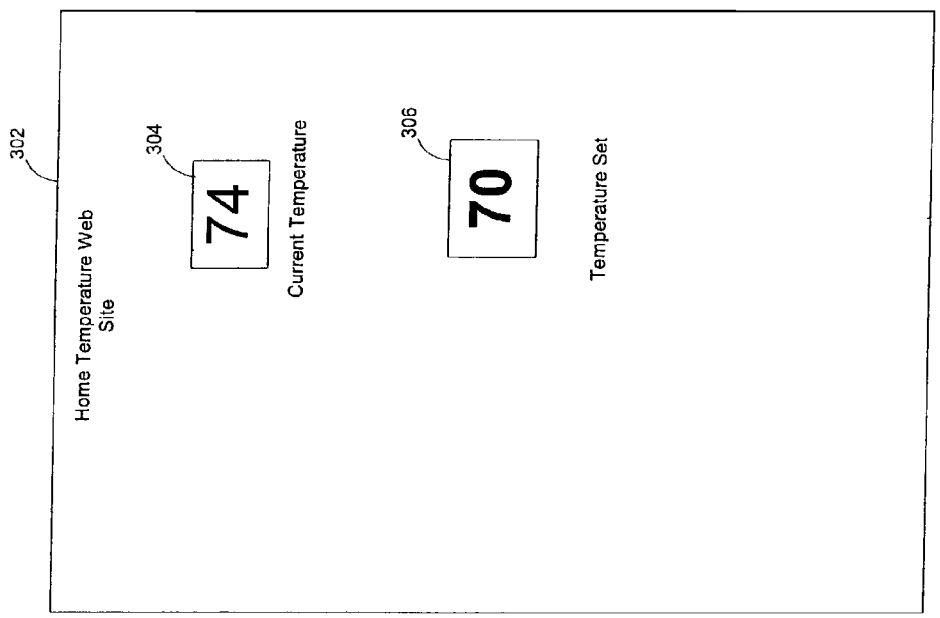
FIG. 3 depicts a web page operated by the server according to one embodiment of the present invention.

FIG. 3 depicts a representative web page 302 operated by server 106 according to one embodiment of the present invention. A field 304 displays the current temperature. A field 306 allows the user to set a desired temperature for house 102. Web page 302, rather than being stored explicitly, is stored within ROM 204 in the form of a series of templates used to generate responses to requests for the web page. An insertion point identifier such as an escape sequence as known in the art may be used where appropriate within the templates to mark where the current temperature should be included when generating the web page.

Figure 4:
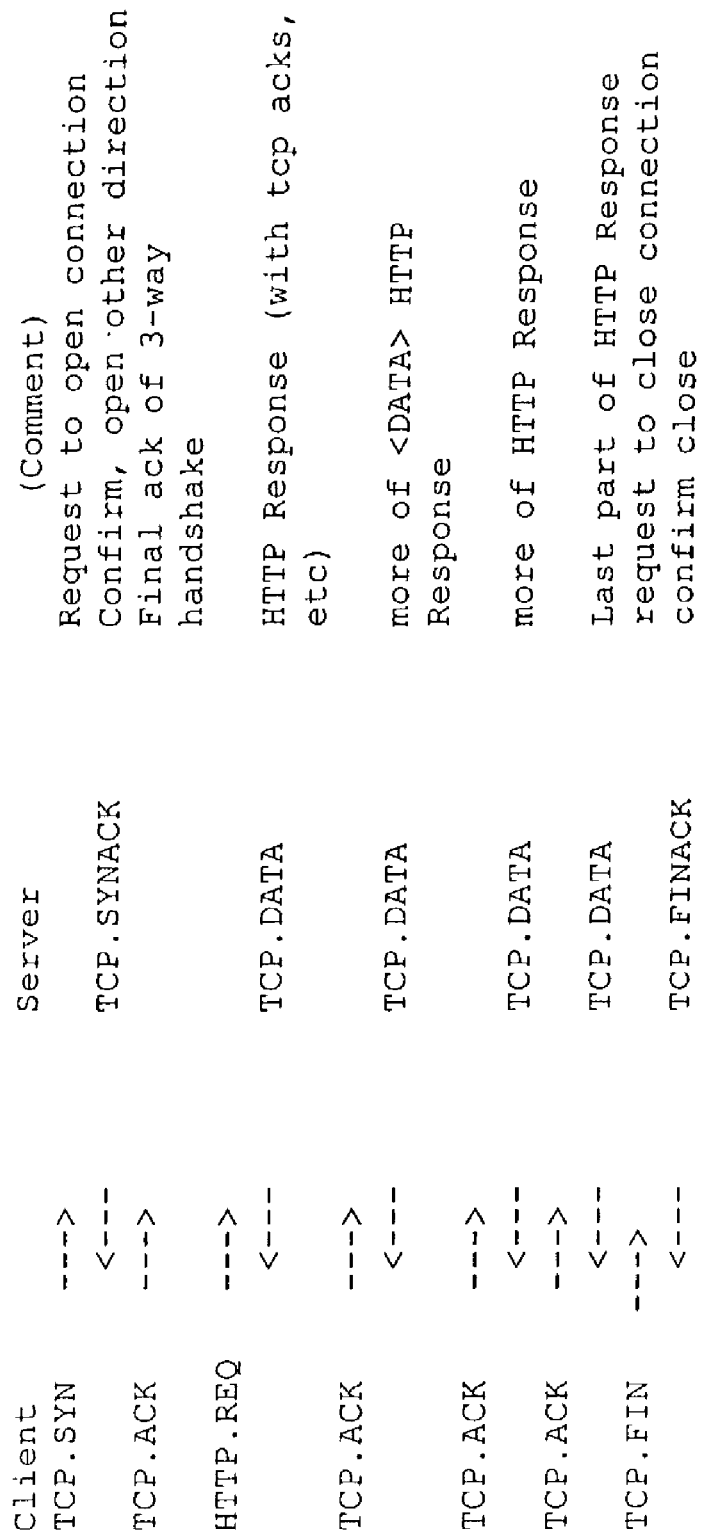
FIG. 4 depicts an interaction between the client and the server according to one embodiment of the present invention.

FIG. 4 depicts an interaction between client 110 and server 106 in accordance with one embodiment of the present invention. For example, client 110 requests the web page 302 depicted in FIG. 3. The interaction begins with a client 110 sending server 106 a TCP.SYN packet to request the opening of a TCP connection. Server 106 responds with a TCP.SYNACK packet to confirm the connection request and open a connection in a reverse direction. The final step of opening the TCP connection is a TCP.ACK packet from client 110 to server 106 confirming the opening of the reverse connection.

Next is an HTTP.REQ packet sent from client 110 to server 106 to request a web page such as the one shown in FIG. 3. Optionally, this may be combined with the TCP.ACK packet. Server 106 responds with a first portion of the web page contents in a TCP.DAT packet which client 110 acknowledges with a TCP.ACK packet. The exchange of TCP.DATA and TCP.ACK packets continues until the entire contents of the web page have been transmitted from server 106 to client 110. Finally, client 110 sends a TCP.FIN packet to request that the TCP connection be closed. In response, server 106 sends a TCP.FINACK packet to confirm the close of the TCP connection.

In one embodiment, the present invention takes advantage of a recognition that server 106 need accommodate only a relatively few different types of interaction as depicted in FIG. 4. Furthermore, each of these interaction types includes only a limited number of packets that represent little information content unique to the particular client-server session. Many packets received and/or transmitted by server 106 will be identical except for a few values. Accordingly, a full implementation of the TCP/IP and HTTP protocols is unnecessary. Instead, server 106 matches received packets to an expected input template and responds by selecting an appropriate response template. Server 106 will typically not comply with the full requirements of the TCP protocol but will nonetheless be useful for simple applications such as providing a single web page and allowing for remote user modification of local parameters such as a thermostat temperature.

According to one embodiment of the present invention, only a very small amount of state needs to be preserved. TCP interaction will typically consist of $N_0$ incoming (client to server) and $N_1$, outgoing (server to client packets). The connection state may only consist of a sequence index to locate where the client and server are in the interaction and the address information of the client.

Figure 5:
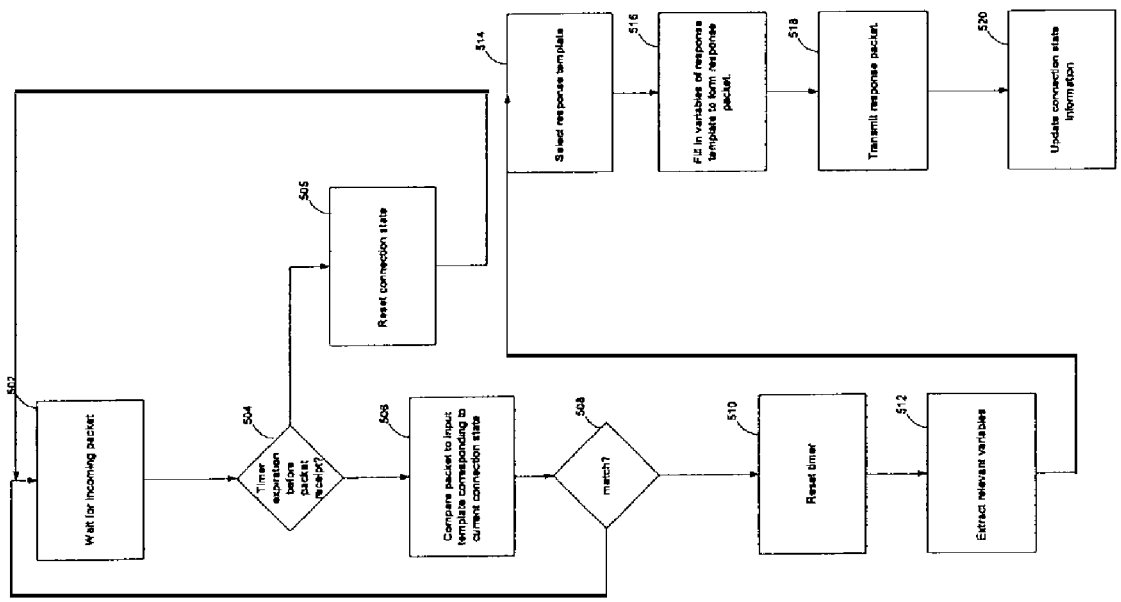
FIG. 5 depicts steps of handling receipt of a packet according to one embodiment of the present invention.

FIG. 5 is a flow chart describing the steps of the operation of server 106 in handling a received packet according to one embodiment of the present invention. At step 502, server 106 awaits an incoming packet. There may be a TCP session in progress or server 106 may be awaiting the beginning of a new session. A step 504 tests for expiration of a timer prior to receipt of a new packet. If the timer expires before a new packet is received, the connection state of any active session is reset, effectively discarding the session, at step 505. After step 505, server 106 resumes waiting for a new packet at step 502. Steps 504 and 505 may be skipped if no connection is active.

Figure 6:
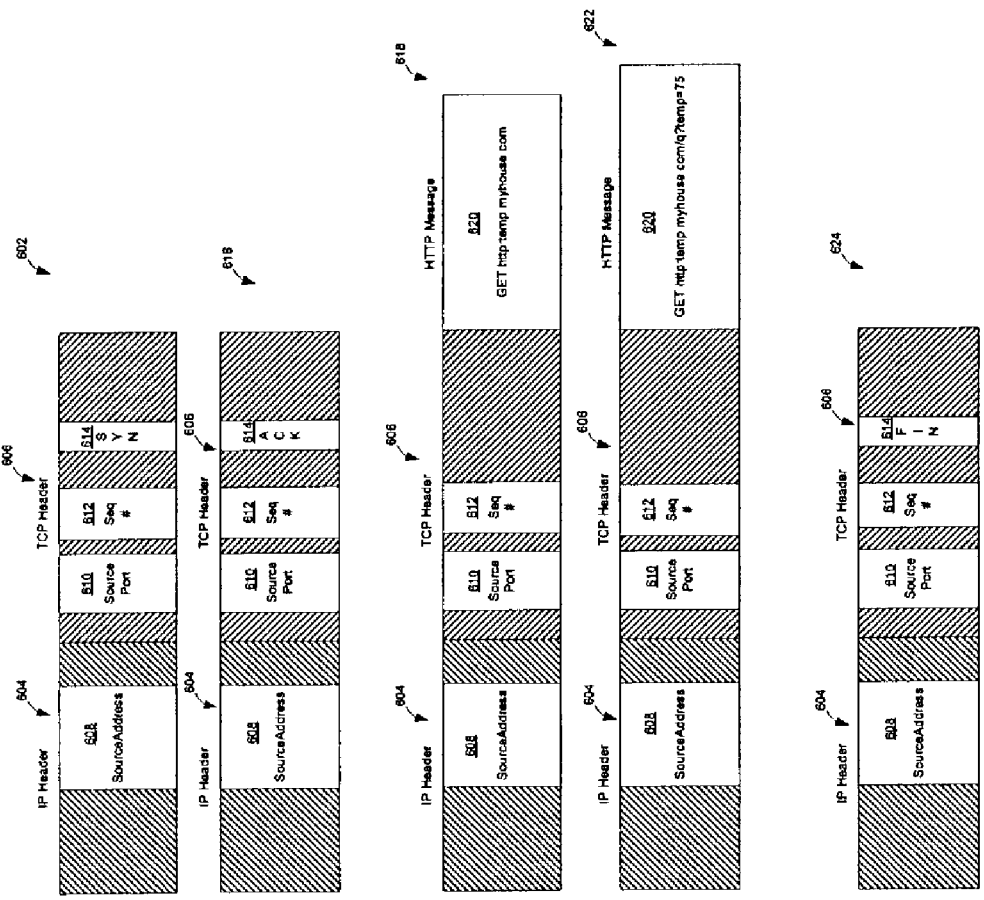
FIG. 6 depicts contents of various input templates according to one embodiment of the present invention.

When a new packet is received, step 506 compares the received packet to an input template corresponding to the current connection state. FIG. 6 depicts a series of input templates that represent a restricted set of TCP/IP packets. A template 602 represents a TCP/IP connection request (TCP.SYN) packet. Template 602 includes an IP header 604 and a TCP header 606. IP header 604 includes all of the required header fields as known in the art. Many of these fields will be the same for all packets directed to server 106 but some fields such as, e.g., time to live (TTL) may be considered "don't care" fields for the purposes of finding and matching a template. The contents of a source address field 608 change depending on the IP address of client 110. This field will be considered a don't-care field for purposes of a match for the initial state where server 106 is awaiting a new connection but will be checked for other connection states so that there is no other.

TCP header 606 includes the required fields as known in the art. Fields that will vary among individual packets include a source port field 610 identifying the source port on client 110 and a sequence number field 612. A flag field 614 will have a bit set to indicate that the TCP packet requests a connection. Other fields will be considered to be "don't care" fields for the purposes of matching.

A template 616 is provided for the purpose of identifying a match to a TCP acknowledgement packet. The fields are similar to that of template 602 except that flag field 614 has a bit set to indicate acknowledgement rather than a connection request.

A template 618 includes an HTTP request, also in the form of a TCP packet. The IP header and TCP headers are essentially as in templates 602 and 616 although there is no particular expected value for flag field 614. A TCP payload field 620 includes the HTTP message GET http:temp.myhouse.com. A match to this template indicates a request for the web page of FIG. 3.

A template 622 also represents an HTTP request for the web page of FIG. 3 along with a request to change the thermostat set temperature. TCP payload field 620 thus holds an HTTP message GET http:temp.myhouse.com/q?temp=75. The value following the equal sign will of course vary with the desired temperature.

A template 624 represents a TCP request to terminate a connection. Template 624 is similar to templates 602 and 616 except that flag field 614 now indicates a request for disconnection.

It will be appreciated that the small set of templates depicted in FIG. 6 provide matches to all of the packets generated by client 110 in the interaction of FIG. 4. In one embodiment, the templates are stored in ROM 204 with the various fields that have variable values being indicated by e.g., special escape codes. There may also be escape codes to indicate the locations of the destination address and destination port. These values will typically be programmable depending on the appropriate network settings and would be added in by processor 202 before using the templates for matching purposes. In one embodiment, duplicate templates are stored with the IP and TCP headers compressed as known in the art.

It will be appreciated that during step 506, the incoming packet need only be compared to the template(s) corresponding to the current connection state, i.e., the current position in the interaction of FIG. 4. Step 508 tests whether the incoming packet is in fact a match. The matching process takes into account any expected layer 2 encapsulation information. If the incoming packet is not a match then execution proceeds back to step 502 to continue waiting for the next expected incoming packet without resetting the timer. It could also be that there is an active connection but the incoming packet represents a request from a new client. In the embodiment described here, these requests are ignored and only one active connection is permitted but it is also possible to respond to such a request by spawning a new session. Thereafter, incoming packets would be compared to the templates appropriate to the connection state of all active connections.

If at step 508, it is determined that the incoming packet matches the response template selected for the current connection state, the timer is reset at step 510. Then, at step 512, any relevant variables are extracted from the received packet. For the initial request, this will include the source address and source port for the purpose of identifying the destination of a response packet. If the packet conforms to template 622, the users input for temperature will be extracted as input to the appropriate temperature control algorithm.

Figure 7:
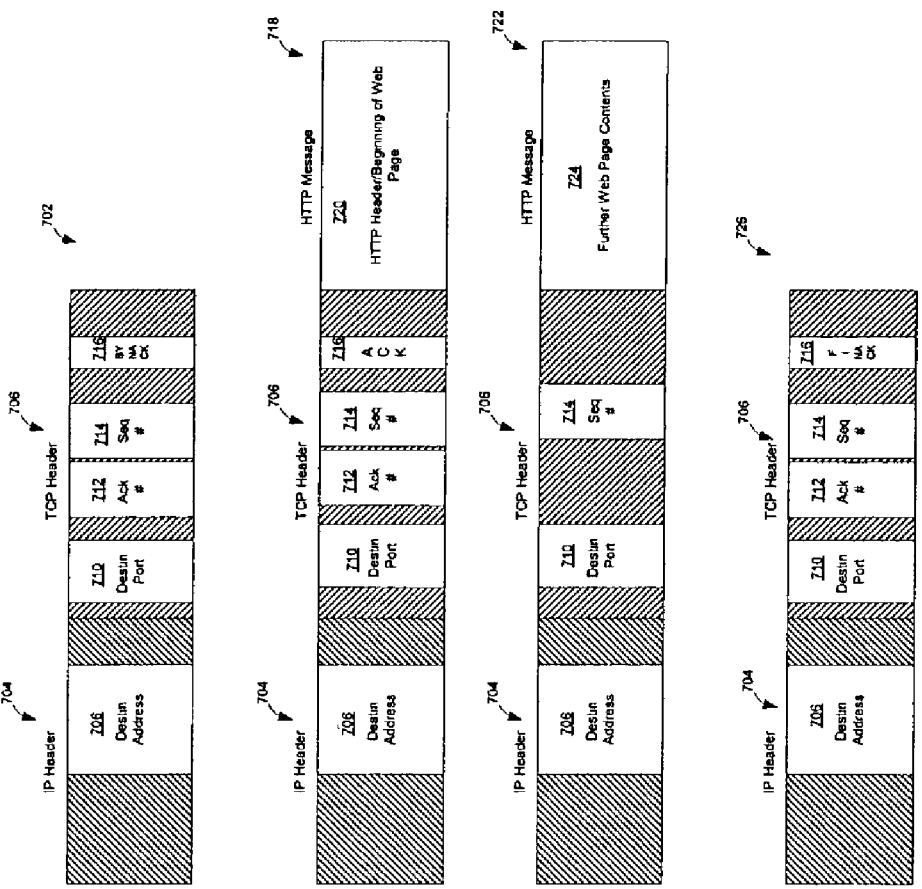
FIG. 7 depicts contents of various response templates according to one embodiment of the present invention.

At step 514, a response template is selected based on the match identified in step 508 and the contents of any relevant variables. FIG. 7 depicts various response templates used to support the interaction depicted in FIG. 4. A template 702 is used to construct the TCP.SYN.ACK packet sent by server 106 in setting up a TCP connection. An IP header 704 includes fixed values for various required fields (not shown) and a destination address field 706 for inserting the IP address of client 110. A TCP header field 708 also includes fixed values for various required fields and a destination port field 710 for inserting the port number of the requesting port on client 110. TCP header 708 also includes an acknowledgment number field 712 for inserting a value indicating the sequence number of the TCP connection request from client 110.

There is a sequence number field 714 for inserting a pseudo-randomly selected initial sequence number for the connection from server 106 to client 110. It is also possible to save computation time by always using the same number here in violation of TCP protocol requirements. A flag field 716 indicates that this is both an acknowledgment of the connection request to client 110 and a request to open a connection to client 110.

A template 718 is used to form the first TCP.DATA packet of FIG. 4. This packet includes the beginning of the contents of the web page of FIG. 3. Acknowledgement field 712 is used to insert sequence number information obtained from the received HTTP request packet. Sequence field 714 is used to insert sequence number information appropriate to the progress of the TCP session. Flag field 716 has an acknowledgement bit set to acknowledge the receipt of the HTTP request. A payload field 720 of the TCP packet includes the beginning of an HTTP message. The message is prefaced by an HTTP header such as "HTTP/1.1 202 Accepted" that indicates that server 106 is fulfilling the client's request. This header is then followed by the web page contents as described by HTML as known in the art. The HTTP header may also include a field specifying the length of the whole HTTP message. The web page may be carried by multiple TCP packets.

A template 722 is used to form TCP.DATA packets carrying further HTML data representing the web page. The further web page contents are stored in a TCP payload field 724 in the form of a continuation of the HTTP message begun by the packet based on template 718. The needed number of different templates along the lines of template 722 will depend on the length of TCP packets being used and the amount of data needed to represent the web page of FIG. 3. Server 106 will typically employ a packet size between 100 to 300 bytes to assure maximum client compatibility, at the expense of extra template storage and some network inefficiency. An escape code sequence may be placed at the appropriate point in the HTML code representing the web page to indicate where current temperature data is to be inserted.

A template 726 is used to form the TCP.FINACK packet of FIG. 4 that confirms the closing of the TCP connection to client 106. The packet structure is similar to that of template 702. Acknowledgement field 712 is for inserting the sequence number of the connection close request. Sequence number field 714 is for inserting a sequence number range appropriate to the TCP session state. Flag field 716 holds an indication that the packet is a confirmation of the connection close.

The templates of FIG. 7 may be stored in ROM 204. To preserve programmability of the IP address of server 106, it may be useful to insert the source address and source support fields as part of the packet processing operation rather than pre-storing them in ROM 204. Again, as in FIG. 6, the locations of any fields for which values should be inserted may be identified by escape sequences as known in the art.

Now that the templates of FIG. 7 have been presented, the process of selecting a response template at step 508 may be explained in greater detail. The response template is selected based on the current connection state. For example, if the client is requesting a connection (input packet was a TCP.SYN packet matching template 602) then response template 702. If the session is at a point such that the received packet was an HTTP request matching template 618 then a response template 718 corresponding to the selected web page is selected. If the connection state is such that the received packet was a TCP.FIN matching template 624, then response template 724 is selected.

The response to a TCP.ACK packet that matches response template 616 will depend on where the client and server are in the interaction depicted in FIG. 4 as indicated by the stored connection state information. After transmission of the TCP.SYNACK, a received TCP.ACK is assumed to represent confirmation of the opening of the TCP connection and no response is necessary. Following an HTTP.REQ an appropriate one of the stored templates 722 is selected depending on how much of the requested web page has already been transmitted.

At step 516, server 106 completes forming the response packet by filling in the relevant variables. For template 702, the destination address field 706, and destination port field 710 are taken from the source address and source port field of the received TCP.SYN packet. The contents of acknowledgement field 712 are determined based on the contents of the sequence number field in the TCP.SYN packet. The sequence number may be pseudo-randomly generated in order to economize on processing power or a fixed number may be used to initiate each TCP connection.

For template 718, the same variables discussed in reference to template 702 will also be inserted at the appropriate points. Furthermore, a variable corresponding to the current temperature may be inserted at an appropriate point in the HTML code found in payload field 720. The acknowledgment number in field 712 will be determined based on the contents of the sequence number field of the HTTP request. The sequence number in field 714 is chosen in accordance with the TCP protocol as known in the art.

The fields of template 722 requiring inserted values are completed in the same manner as template 716 except that the sequence number is incremented further in accordance with the TCP protocol. Also, if the temperature variable is found in the portion of the HTML code included in template 720, it is inserted at the appropriate location.

Template 726 is filled in with the destination address, destination port, and acknowledgment number information taken from the received TCP.FIN packet. The acknowledgment number in field 712 is determined based on the contents of the sequence number field of the TCP.FIN packet.

As formed, the response packet includes any necessary layer 2 encapsulation including PPP, etc. At step 518, the response packet is transmitted over network 108 to client 110. Any necessary MAC layer encapsulation is provided by network interface 208. Furthermore, if a new temperature value has been received from client 110, it is used to adjust the thermostat. At step 520, the stored connection state information is update to identify where the client and server are now in the interaction of FIG. 4, and to store the source address information of a newly received connection request.

It will be seen that a simple useful web server has been implemented with minimal processor and memory requirements by providing a partial implementation of certain Internet protocols. Essentially, the server plays back a prerecorded packet stream.

It is understood that the examples and embodiments that are described herein are for illustrative purposes only and various modifications are changes in light there of will be suggested to persons skilled in the art and are to be included within the spirit and purview of this application and scope of the appended claims and their full scope of equivalents.

The invention claimed is:

1. A method for operating a server to handle a request from a client to control an appliance, said method comprising:
storing at said server one or more predefined input templates each associated with a connection state between said server and said client, and a plurality of response templates;
receiving at said server a packet via a network interface from said client, said server implemented in a microcontroller of the appliance;
determining a current connection state between said server and said client;
comparing the received packet with said one or more predefined input templates associated with the current connection state;
if the received packet matches said one or more predefined input templates extracting variables from the received packet;
selecting one of said plurality of response templates based on the matched predefined input template;
inserting said extracted variables into said selected response template;
transmitting said selected response template from said server to said client;
wherein said connection state is based on progress within a predefined interaction between said server and said client, said predefined interaction following a protocol fully implemented by said client but not by said server.

2. The method of claim 1 wherein said protocol comprises TCP.

3. The method of claim 1 further comprising:
repeating receiving, determining, and transmitting to respond to a request for a web page from said client.

4. The method of claim 1 wherein a total number of stored input templates is 10 or less.

5. The method of claim 1 wherein said input templates are configured to identify protocol packets that may be received at said server.

6. The method of claim 1 wherein said response templates are configured to generate said response.

7. The method of claim 1 wherein the microcontroller controls a thermostat.

8. The method of claim 1 wherein the microcontroller controls a light switch.

9. The method of claim 1 wherein the mircrocontoller controls an alarm system.

10. The method of claim 1 wherein said progess within said predefined interaction is selected from a group consisting of requesting opening of a TCP connection, receiving data via said open connection, and requesting closing of said TCP connection.

11. The method of claim 1 wherein the received packet comprises a connection request packet or a data request packet.

12. Apparatus for operating a server to handle a request from a client to control an appliance, said apparatus comprising:
- a network interface that communicates with said client via a network;
- a memory system that stores one or more predefined input templates each associated with a connection state between said server and said client, and a plurality of response templates; and
- a processor configured to determine a current connection state between said server and said client, compare a received packet with said one or more predefined input templates associated with the current connection state, extract variables from the received packet if the received packet matches said one or more predefined input templates, select one of said plurality of response templates based on the matched predefined input template, insert said extracted variables into said selected response template, and transmit said selected response template from said server to said client,
- wherein said processor is implemented in a microcontroller of the appliance and said connection state is based on progress within a predefined interaction between said server and said client, said predefined interaction following a protocol fully implemented by said client but not by said server.

13. The apparatus of claim 12 wherein said protocol comprises TCP.

14. The apparatus of claim 12 wherein said one or more input templates comprises 10 or fewer input templates.

15. The apparatus of claim 12 wherein said memory has a capacity of less than 64K.

16. Apparatus for operating a server to handle a request from a client to control an appliance, said apparatus comprising:
- memory for storing at said server one or more predefined input templates each associated with a connection state between said server and said client, and a plurality of response templates;
- means for receiving at said server a packet from said client, said server implemented in a microcontroller of the appliance;
- means for determining a current connection state between said server and the client;
- means for comparing the received packet with said one or more predefined input templates associated with the current connection state;
- means for extracting variables from the received packet if the received packet matches said one or more predefined input templates;
- means for selecting one of said plurality of response templates based on the matched predefined input template;
- means for inserting said extracted variables into said selected response template; and
- means for transmitting said response from said server to said client;
- wherein said connection state is based on progress within a predefined interaction between said server and said client, said predefined interaction following a protocol fully implemented by said client but not by said server.

17. The apparatus of claim 16 wherein said protocol comprises TCP.

18. The apparatus of claim 16 further comprising:
- means for repeatedly invoking said means for receiving, determining, and transmitting to respond to a request for a web page from said client.

19. A computer-readable medium storing computer executable instructions for operating a server to handle a request from a client to control an appliance, said computer-readable medium configured for storing one or more predefined input template each associated with a connection state between said server and said client and a plurality of response templates said instructions are executed to perform the steps of;
- receiving at said server a packet from said client, said server implemented in a microcontroller of the appliance;
- determining a current connection state between said server and said client;
- comparing the received packet with said one or more predefined input templates associated with the current connection state;
- extracting variables from the received packet if the received packet matches said one or more predefined input templates;
- selecting one of said plurality of response templates based on the matched predefined input template;
- inserting said extracted variables into said selected response template; and
- transmitting said response from said server to said client;
- wherein said connection state is based on progress within a predefined interaction between said server and said client said predefined interaction following a protocol fully implemented by said client but not by said server.

20. The computer program product of claim 19 wherein said protocol comprises TCP.

21. The computer program product of claim 19 wherein no more than 10 of said input templates are stored.

* * * * *